(12) United States Patent
Bailey et al.

(10) Patent No.: US 6,473,767 B1
(45) Date of Patent: Oct. 29, 2002

(54) FILE SYSTEM FOR A COMPUTER AND METHOD OF SYNCHRONIZING SETS OF FILES

(75) Inventors: Nicholas Raymond Bailey, Southampton; Christopher Derrick Cawthorne, Winchester; Richard John Gadd, Eastleigh; Robert Harris, Christchurch, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,281

(22) Filed: Apr. 26, 2000

(30) Foreign Application Priority Data

Dec. 21, 1999 (GB) ............................... 9930124

(51) Int. Cl.$^7$ ............................................. G06F 17/30
(52) U.S. Cl. ........................... 707/102; 707/1; 707/203; 707/511
(58) Field of Search .................. 707/1, 10, 100, 707/102, 200, 201, 202, 203, 204, 513, 4, 5, 9, 104.1, 511

(56) References Cited

U.S. PATENT DOCUMENTS

| | | | |
|---|---|---|---|
| 4,912,637 A | 3/1990 | Sheedy et al. | 707/203 |
| 5,175,852 A | * 12/1992 | Johnson et al. | 707/8 |
| 5,278,979 A | 1/1994 | Foster et al. | 707/203 |
| 5,367,671 A | * 11/1994 | Feigenbaum et al. | 707/1 |
| 5,611,066 A | * 3/1997 | Keele et al. | 711/100 |
| 5,771,381 A | 6/1998 | Jones et al. | 713/100 |
| 6,202,070 B1 | * 3/2001 | Nguyen et al. | 707/104.1 |

FOREIGN PATENT DOCUMENTS

| | | | |
|---|---|---|---|
| EP | 0 230 616 | 8/1987 | G06F/15/40 |
| EP | 0 841 615 | 5/1998 | G06F/9/445 |

* cited by examiner

*Primary Examiner*—Jean M. Corrielus
*Assistant Examiner*—Shahid Alam
(74) *Attorney, Agent, or Firm*—Casey P. August

(57) ABSTRACT

A file system for a computer supports a plurality of directories, each maintaining a list of data files as a plurality of directory entries. As well as means for creating data entries for real data files, the system includes means for creating anti-file directory entries having an attribute indicating there is no real data file corresponding to the entry. Entries may be moved between directories and when an anti-file and a data file of the same name are present in the same directory, the real data file is deleted. This enables the synchronization of sets of target and source files to take account of changes.

20 Claims, 3 Drawing Sheets

FILE SYSTEM FOR A COMPUTER AND METHOD OF SYNCHRONIZING SETS OF FILES

TECHNICAL FIELD OF THE INVENTION

The present invention relates to file systems for computers and to a method of synchronising a set of named target files with a set of named source files.

BACKGROUND OF THE INVENTION

All modern computers employ a file system as a part of their operating system. A principal task of the file system is to enable a user to create a logical structure of files of data and to manage the secondary storage of. this data onto disk or tape, controlling its retrieval and security. To do this, it is usual for the system to create a structured directory, also on secondary storage, in which entries identify the file by name and some of its properties and also include a logical pointer to data storage areas in which, for example, fixed size blocks may be chained together by pointers.

Every user of a personal computer is familiar with the hierarchical appearance of his or her own file structure in which large numbers of subdirectories may be created, each containing a potentially quite large number of files. At times it is desirable to add modify or delete information and to move the changed information to different subdirectories (sometimes called folders) or even to other file systems (such as between a hard disk and a network server). Typical operations allowed by the operating system include:

Create—which creates an entry for a provided file name in the directory;

Delete—which deletes an existing directory entry and releases the corresponding secondary storage;

Rename—which renames an existing file in the directory;

Copy—which copies a file to another subdirectory or file system, leaving the original;

Move—which moves the file without leaving the original and

List—which lists files with specified properties or attributes in response to a query command Other common operations such as Open, Close, Read and Write are not relevant to the present invention.

At a somewhat broader level than the personal computer file system, library systems also exist with similar logical structures and operations. One application of a library system is to hold the source code modules created and modified during the development of a computer program in a structured library and to provide current sets of these modules to a build process so that an executable version of the current level of program can be compiled, link edited and tested. Another similar arrangement is an install suite of executable and associated files of a software package which provides the complete set of files necessary to run and administer that package. When components are replaced or updated, a new install suite must be created on the user's system to replace the original. All these systems are intended to be included within the scope of the broad term "file system" as used herein.

In general, in all these cases, there is a problem of maintaining synchronisation between two sets of files: a set of source files and a set of target files. The trivial solution is to delete all the files from the target and copy all the files from the source set. This is reliable but can take a great deal of time if the source set is very large.

An alternative is to try to identify only the changes that have taken place on the source set and to make the same changes to the target set. It is a relatively simple matter to identify the new files and files whose contents have been changed by examining a modification date (or timestamp) associated with the file and to copy these new or changed files to the target file set.

Various comparison methods for determining which of a set of source files has changed and must be copied to a target set are shown in published patent applications EP 0230616 A2 and EP 0841615 A2 and in U.S. Pat. No. 4,912,637, 5,278,979 and 5,771,381. The applications described in these patents are to version control of source code, software package updating and computer system configuration control.

However, the latter method will not work for files which have been deleted from the source file set which will remain on the target copy. Only by replacing all files or at least listing them all so as to determine which have been deleted, can deleted files at source be removed from the target set.

The continued presence of files which should have been deleted can cause problems. For example in the source code version control case, when the executable code is compiled, it is important that source parts which reference a deleted file should fail to compile so that these references can be detected and deleted by the code developers. If the item is left in the build target file set (or "shadow"), then the executable code might build without errors but would not accurately reflect the status of the source library file set. Detection of parts which are no longer present is not easy. It relies on the deletion being recorded and the record of it being accessible to the process that maintains the shadowing. In view of the "undo" capability for a library system command, an accurate determination of the status of such records is invariably complex.

Presently available file and library'systems do not have the ability to easily handle deleted files so that copies are automatically deleted.

SUMMARY OF THE INVENTION

Accordingly, the present invention provides a file system for a computer comprising non-volatile storage for storing a plurality of directories, each for maintaining at least one list of data files as a plurality of directory entries; first means for creating data file directory entries, each of which includes a file name, file attributes and a pointer to the location of said file data in storage; second means for creating anti-file directory entries, each of which includes a file name and also a file attribute indicating there is no real data file corresponding to the directory entry; means for moving entries between directories; means for comparing data file and anti-file names in said directory entries within a directory; and means responsive to an equal compare by said comparing means to delete the directory entry for the respective real data file, thereby releasing the corresponding location in storage.

According to another aspect, the invention also provides a file handling computer program capable of supporting a plurality of directories, each for maintaining at least one list of data files in non-volatile storage as a plurality of directory entries; said computer program comprising: first means for creating data file directory entries, each of which includes a file name, file attributes and a pointer to the location of said file data in storage; second means for creating anti-file directory entries, each of which includes a file name and also a file attribute indicating there is no real data file corresponding to the directory entry; means for moving entries between directories; means for comparing data file and anti-file names in said directory entries within a directory; and means responsive to an equal compare by said comparing means to delete the directory entry for the respective real data file, thereby releasing the corresponding location in storage.

In such a system, anti-files can either be created directly in the system as the result of a create anti-file command or they can be created as a result of a command to delete an existing real data file. In the latter case, the invention also provides a method of synchronising in a computer system a set of named target files, listed as entries in a target directory, with a set of named source files containing data, listed as entries in a source directory, the source files being subject to change in response to respective external commands to create new source data files and to delete and to modify existing source data files, the method comprising the steps of: in response to an external command to delete-a source data file, deleting the corresponding source directory entry and creating an anti-file directory entry, being an entry with the same name but having an additional attribute indicating there is no real data file corresponding to the anti-file directory entry; copying all changed source data file directory entries to the target directory so as to replace any like named target directory entries with the copied directory entries; and deleting from the target directory any real data file entry having an anti-file of the same name.

This permits copies of directories to be synchronised in file systems, generally including library systems for source code control and application package install suites. The changed files are preferably identified by some sort of currency information such as a timestamp or version number.

Although anti-file directory entries will preferably delete the correspondingly named real file entries in the target directory as a result of being copied, it would be possible for them to be processed within the source file system which could replace the copy command to the target directory with a delete command, directed at the target file.

The question arises as to what should happen to the anti-file entry after being copied to the target directory. One simple possibility is that the anti-file entry should also be deleted. However, it is also possible that the anti-file entry could include a count attribute which, if non-zero would allow the anti-file entry to remain in the target directory, being decremented whenever a further real file entry of the same name was copied into the directory. Eventually, the anti-file directory entry would be deleted when the count attribute reached zero.

Another use of a persistent anti-file entry with a count attribute is where the target directory is only a buffer and synchronisation with a further directory is required in which the anti-file entry can play the same role of deleting real file entries which no longer exist in the source directory.

Although the invention is described as implemented in a single platform, it can also be applied across multiple platforms provided the file system on each platform is a system according to the invention, capable of handling anti-files, and that the data interchange between platforms correctly communicates the anti-file attributes.

DETAILED DESCRIPTION OF THE INVENTION

Figure 1:
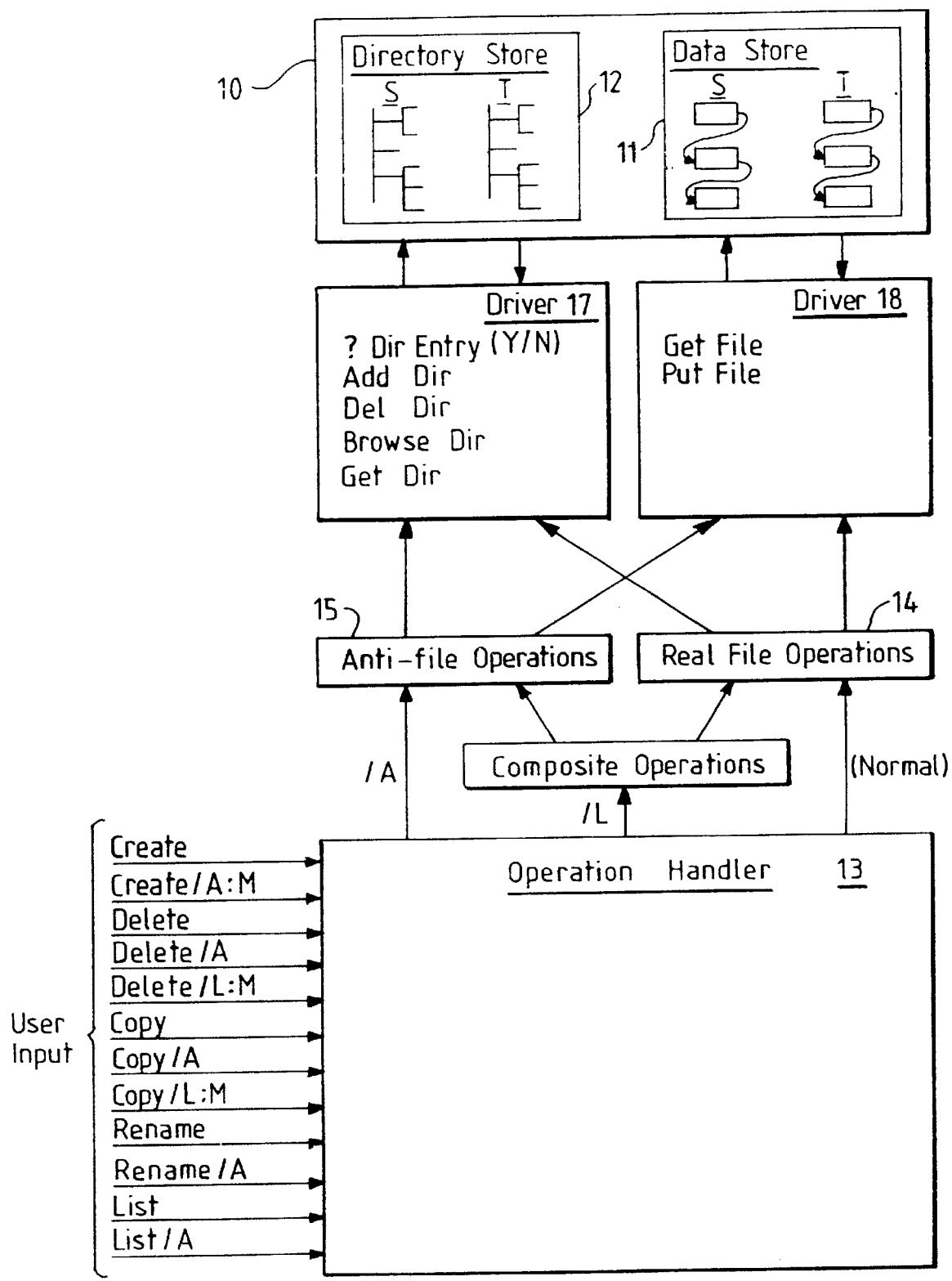
FIG. 1 is a schematic diagram of a file system according to the present invention.
Figure 2:
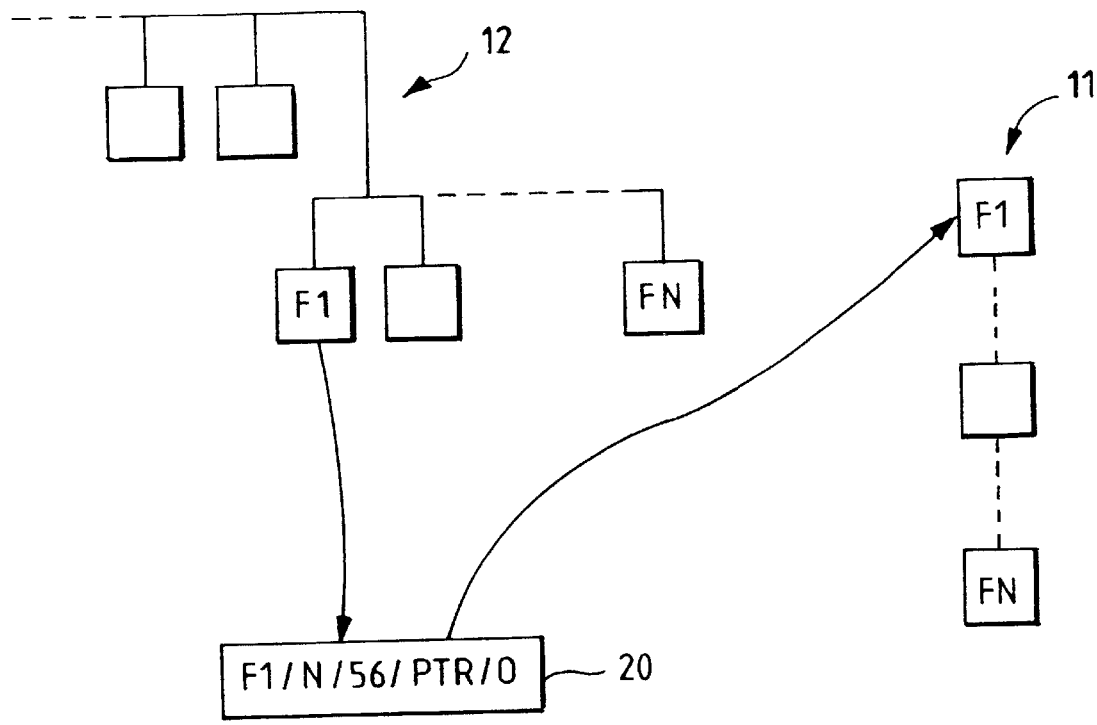
FIG. 2 shows a typical directory and data store structure in such a file system.

FIG. 1 shows an overview of a file system according to the invention, comprising non-volatile secondary storage 10, such as a disk drive in which both data files 11 and directories 12 to those files are stored. Two directories and two sets of corresponding data files are schematically illustrated. These may be source (S) and target (T) versions of the same information which is required to be kept in synchronisation. A typical portion of one of the directories 12 is shown in FIG. 2 in which directory entries are arranged hierarchically and which may contain individual file entries such as 20 at the lowest level. The file entries contain a name field and a pointer field PTR which points to the location in storage area 11 of the actual data file, F1 in the illustrated example.

The directory entry for a file—whether normal or anti—is, minimally:
  file name
  file type Normal | Anti (N/A)
  file size (normal file only)
  data ptr (normal files only)
  anticount (antifile only)

Returning to FIG. 2, various operations can be performed on file data entries in a directory. As far as relevant to this invention, these are: CREATE, DELETE, COPY, MOVE, RENAME AND LIST. These operations will now be considered for normal files and anti-files.

CREATE is often implicit, in that it involves creating an entry for the file name in the file system in order to read, write or perform other operations on the file. In the case of an anti-file the file system entry for the file has an attribute which indicates its special status. The file becomes an anti-file due to it being deleted as a normal file, the DELETE operation is used with an option that indicates that an anti-file is required. The nature of the anti-file can be transient (it is deleted when it deletes its counterpart normal file) or persistent (it is retained after such deletion takes place).

DELETE removes the file system entry for the file. Normal files and anti-files are handled in exactly the same way. The DELETE for a normal file may be used with an option that requests that an anti-file be created. DELETE for an anti-file simply deletes the anti-file in the directory.

RENAME changes the name associated with the file, it works exactly the same for normal files and anti-files. A file cannot be renamed to have the same name as an existing file. On Unix there is no RENAME operation, MOVE is used instead.

COPY takes the file in location A and creates a file with the same name and contents in location B. This operation often has user options that determine the behaviour when the target location already has a file with the same name, for example to allow the target file to be over-written by the new file or not. Assuming that the disposition of the options is such that a new file would over-write the target file there are these cases to consider:

File name does not exist on target. A new file is created, with the same name as the original, and the same properties as the original. If the original is an anti-file the new file is an anti-file.

File to copy is a normal file and same-name normal file already exists on target. The target file is replaced by the original file, with the same file properties as the original.

File to copy is an anti-file and same-name normal file already exists on target. The target file is replaced by the anti-file, which itself is then deleted (transient) or retained (persistent) as the conclusion of the copy operation.

File to copy is a normal file and same-name anti-file already exists on target.

The new file is copied but then deleted due to the presence of the anti-file. The effective outcome is the same as if the original file is not actually copied at all. The target anti-file is deleted (transient) or retained (persistent) as the conclusion of the copy operation.

Thus, it can be seen that there are two types of anti-file, transient and persistent. Transient ones annihilate on copy when they meet a same-named normal file. Persistent ones stay around even after replacing the same-named normal file, so they can be perpetuated further. Anti-files cannot be read by normal processes, so a persistent anti-file counts the same as a file not being present to ensure that the deletion of the original has been successful from the point of view of (say) an include process. Obviously copying the anti-file must be an allowed operation, but that does not mean that they are readable in the normal sense.

The effect of an anti-file can also work in two directions. The normal case we have considered is the 'forwards' direction, where the anti-file is copied to replace the same-named real file. The other case is where the anti-file exists in the target library, and the normal file is copied to replace it. This will cause the same annihilation. This technique would be useful, for example, in setting up a scheme where unwanted 'cookies' created by Web applications are deleted at the point of creation simply by having a persistent anti-file with the correct name already resident in the file system. These would behave like "mines" and would normally be used to ensure that no process could create certain-named files.

MOVE is normally a COPY to target and local DELETE. On the Unix file system this operation is also used to rename a file (by moving it to replace itself). In both cases the MOVE operation for an anti-file has the same rules as COPY above.

LIST is simply the means of querying the contents of the file system. Anti-files are not normally shown by list operations, since they represent files that are not present. User options on the LIST operation can be used to show the anti-files.

Various parameters may be specified for these operations, following a slash (/).These are "/A", indicating an antifile operation, "/L" indicating a composite operation on both real and anti-files and ":m", which is a count field used only with anti-file operations. The various operations are directly commanded by a user or called via a user API, as input to an operations handler 13, as shown in FIG. 1. The operations handler 13 distributes them, according to the type of file to be operated on to real file operations code 14, anti-file operations code 15 or composite file operations code 16, which actually implement the operation on the directory entries 12 and data store 11 via drivers 17 and 18

The drivers 17 and 18 respond to file operations by checking if the file directory entry exists (DIR ENTRY?). Depending on the answer and the particular operation, they can then add a directory entry (ADD DIR) or delete one (DEL DIR). The delete action may be taken on a real file, for example, if a comparison indicates that an anti-file of the same name is being copied to the directory.

In more detail, the logical operations supported by the file system are:

| | |
|---|---|
| CREATE | -> name/N/0/ptr/0 (creates a real file directory entry with file size zero) |
| CREATE /A:m | -> name/A/0/0/m (creates an anti-file directory entry, where m is the number of real files an anti-file may destroy before itself being deleted. If a normal file with the matching name exists in the directory, then the anti-file immediately destroys the normal file. Otherwise, it persists in the system until m becomes zero.) |
| DELETE | -> removes the entry if name/N/*/*/0 is in the directory (removing or releasing the corresponding data blocks) |
| DELETE /A | -> removes the entry if name/A/0/0/* is in the directory (deletes anti-file which has not yet expired) |
| DELETE /L:m | -> removes the entry if name/N/*/*/0 is in the directory and then adds name/A/0/0/m (effectively deletes a normal file then creates an anti-file of the same name) |
| LIST | -> shows all entries matching */N/*/*/0 (lists the normal files) |
| LIST /A | -> shows all entries matching */A/0/0/* (lists the anti-files) |
| COPY | -> copies the name/N/*/*/0 entry to another directory as name/N/*/*/0 (copies normal file entry to the other directory) |
| COPY /A | -> copies the name/A/0/0/* entry to another directory as name/A/0/0/* (copies anti-file entry to the other directory) |
| COPY /L:m | -> copies the name/N/*/*/0 entry to another directory as name/A/0/0/m (creates an anti-file of the same name in the new directory) |

It will be recalled that the MOVE operation is essentially the same as a COPY plus a DELETE, so no further details are necessary here.

| | |
|---|---|
| RENAME | -> alter the name/N/*/*/0 entry to newname/N/*/*/0 (normal file rename) |
| RENAME /A | -> alter the name/A/0/0/* to newname/A/0/0/* (anti-file rename) |

It is helpful to consider the various cases of anti-file operation:

Case 1: Normal File Present, Antifile Created with the Same Name—Single Shot Mode (CREATE /A:1)

The antifile deletes the normal file and removes itself from the directory

Before: name/N/1/ptr/0

Action: name/N/1/ptr/0 & name/A/0/0/1

After: (no directory entry remaining)

Case 2: Normal File Present, Antifile Created with the Same Name—Multishot (Mine) Mode (CREATE /A:n n>1)

The antifile deletes the normal file and leaves itself around

Before: name/N/1/ptr/0

Action: name/N/1/ptr/0 & name/A/0/0/n

After: name/A/0/0/n−1

Case 3: Single Shot Antifile Around, Normal File Created

The Normal File is Deleted and the Antifile Removed

Before: name/A/0/0/1

Action: name/A/0/0/1 & name/N/1/ptr/0

After: (no directory entry remaining)

Case 4: Multishot Antifile Around, Normal File Created

The normal file is deleted but the antifile remains active

Before: name/A/0/0/n (n>1)

Action: name/A/0/0/n & name/N/1/ptr/0

After: name/A/0/0/n-1

A practical example of how the above system can maintain synchronisation between two sets of files will now be described with reference to FIG. 3. By way of example, suppose we have a set of three files A, B and C and wish to maintain a copy of these same files. Initially, they would just be copied to the new location:

| SOURCE | TARGET |
|--------|--------|
| A | A |
| B | B |
| C | C |

At some later stage, the contents of file A are changed to A' and B is deleted but replaced with an anti-file B*, so that we now have:

| SOURCE | TARGET |
|--------|--------|
| A' | A |
| B* | B |
| C | C |

Figure 3:
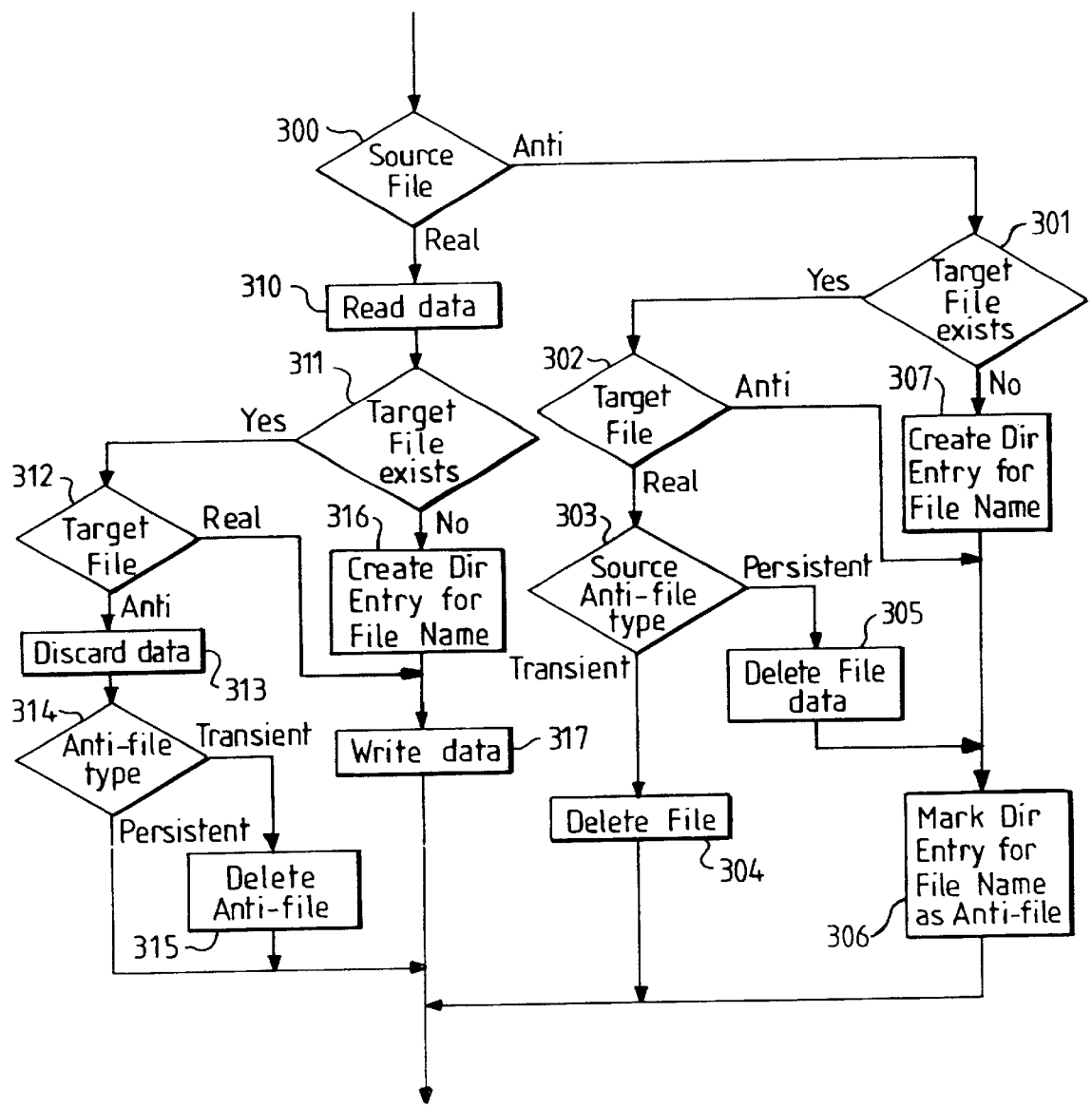
FIG. 3 is a flow diagram of a Copy operation in the file system of FIGS. 1 and 2.

Each file is then copied from source to target in the manner illustrated in FIG. 3.

If source file 300 is an anti-file, such as B*, as determined from its N/A attribute field and a target file entry exists (301), it is copied over the target file 302, such as B. If file 302 is a real file, the source anti-file type is checked (303) from the anti-file count field, m, to determine if it is transient (m=1) or persistent (m>1). If transient, file 302 (B in the above example) is deleted (304), and the anti-file B* is not written to the target directory.

If the anti-file is persistent, the target file B is still deleted (304) but the anti-file B* is written to in the target file directory, marked as an anti-file (305). To complete the description of the right hand side of FIG. 3, the two other cases which might arise are that there was no target file of the same name, in which case a target anti-file entry is simply created as a result of the copy operation (307) or the target file was already an anti-file, in which case the new anti-file entry is copied over it. In these two cases, the resulting target file directory entry is marked as an anti-file (306) by setting the appropriate attribute to A.

Turning now to the left hand side of FIG. 3, if the source file was a real file to be copied, such as A' or C in the above example, then its data would be read (310). If no target file exists (311), a directory entry is created (316). If a target file does not exist and is real (312) then the data read at 310 is written to data storage (317). If the target file entry was indicated to be an anti-file at 312, the data read at 310 would be discarded (313) and the anti-file type determined (314). If transient, the anti-file would be deleted (315) or if persistent, would remain in the target directory. If the target file was real, the new data pointed to by A' or C would be written to disk (315).

The invention as described above may be applied to a build library process for program source code development. The development of long and complex computer programs or other machine readable material involves the creation of source material, often in separate modules, and its repeated editing and revision through multiple iterations. Keeping track of these iterations so that the eventual document represents the most current version is a problem, particularly if there are multiple authors of the separate parts. Eventually, the final version must be built from the correct and current parts.

A common way of storing source code for a product is in a library system which supports at least the operations of storing new or changed source parts into the system, retrieving a specific level of source part, or querying and reporting on the parts in the system.

The changes to source code during the development process are often maintained by the library system in such a way that a particular level or set of changes can be extracted from the library as input to the process used to build the product.

The build process consists of the operations of compiling, linking and otherwise processing the input source to create the executable code in the shipped product. The build process is not necessarily carried out on the same operating system or physical machine as the library system, in some cases the product source for more than one eventual target operating system is extracted from the library system and built differently on each target system.

In order to build the relevant source parts for a product, it is necessary to get the correct level of those source parts in a location where the build processes can use them. This shadowing process is where problems start to arise. For performance reasons it is attractive to move only the new or changed data to the build shadow, yet the contents of the build shadow must reflect exactly the set of source which is intended to be built. If a source part is no longer present in the library then the shadowed counterpart of that source part must be deleted.

The above described implementation of the invention may be used to handle these repeated copy and delete operations in such a way that the build shadow is always current and contains no files which have been deleted from the source.

Another application of the invention as implemented herein is to an install process for a software package. The main aim of an install process for the executable and associated files of a software package is to provide the complete set of files necessary to run and administer that package.

If the package is already installed on the target system when this install process runs it must make sure that none of the files from the older version of the package are left in situ, since these would cause confusion or even errors. For example, old files containing help information may be referred to by the user because they are visible in the system, thus causing confusion.

Install processes commonly use the locally-held information about the prior version to use the 'uninstall' process of that system to clear up the old version before installing the new material. This depends on the system having information about the package version so that the appropriate files can be deleted. If this information is damaged or incomplete due to ill-advised attempts to remove the package manually then the install process will not be able to delete the appropriate files before the new install. The information might be unusable because it is for an unsupported version of the package (e.g. a beta-test version which did not install using the conventional mechanism).

If a new version of a package must remove all the previous versions of files which need to be deleted it can embody anti-files for all files in all versions of the package which have been shipped before, except for those files which exist in this current version of the package. The real files will replace any like-named files on the system, and the anti-files will account for all other files that may be there from earlier versions. At the end of the install the process deletes any anti-files which remain, thus guaranteeing that all prior versions of files are either replaced by the latest version or deleted.

What is claimed is:

1. A file system for a computer comprising non-volatile storage for storing a plurality of directories, each for maintaining at least one list of data files as a plurality of directory entries;
    first means for creating data file directory entries, each of which includes a file name, file attributes and a pointer to the location of said file data in storage;
    second means for creating anti-file directory entries, each of which includes a file name and also a file attribute indicating there is no real data file corresponding to the directory entry;
    means for moving entries between directories;
    means for comparing data file and anti-file names in said directory entries within a directory; and
    means responsive to an equal compare by said comparing means to delete the directory entry for the respective real data file, thereby releasing the corresponding location in storage.

2. A file system as claimed in claim 1 in which the deleting means is also responsive to an equal compare to delete the anti-file directory entry as well.

3. A file system as claimed in claim 1 in which the anti-file attributes include a count, the second entry creating means being responsive to an equal compare to decrement the count attribute by one and in which the deleting means continues to delete identically named data file directory entries created by said first entry creating means as long as said count is non-zero.

4. A file system as claimed in claim 3 in which the deleting means is responsive to delete the anti-file directory entry when said count equals zero.

5. A file system as claimed in claim 1 in which the second entry creating-means responds to an external system command to delete a real data file by creating an anti-file of the same name.

6. A method of synchronising in a computer system a set of named target files, listed as entries in a target directory, with a set of named source files containing data, listed as entries in a source directory, the source files being subject to change in response to respective external commands to create new source data files and to delete and to modify existing source data files, the method comprising the steps of:
    in response to an external command to delete a source data file, deleting the corresponding source directory entry and creating an anti-file directory entry, being an entry with the same name but having an additional attribute indicating there is no real data file corresponding to the anti-file directory entry;
    copying all changed source data file directory entries to the target directory so as to replace any like named target directory entries with the copied directory entries; and
    deleting from the target directory any real data file entry having an anti-file of the same name.

7. A method as claimed in claim 6 in which said anti-file directory entries are copied to the target file directory to cause deletion of said like named target data file entries.

8. A method as claimed in claim 7 in which said copying action, in the case of anti-file directory entries where a target data file directory entry of the same name is deleted, also deletes the anti-file directory entry.

9. A method as claimed in claim 8 in which anti-file directory entries also include a count attribute which is decremented by one when an anti-file directory entry is copied to the target directory.

10. A method as claimed in claim 9 in which a copying of a further real file directory entry of the same name to the target directory further decrements the count attribute of-the corresponding anti-file directory entry, said anti-file directory entry being deleted when its count attribute decreases to zero.

11. A method as claimed in claim 6 in which said source directory entries include currency information, the method including the step of determining which source files have been changed by examination of said currency information.

12. A method as claimed in claim 11 in which said currency information is a timestamp.

13. A method as claimed in claim 6 in which the source files are computer program source code.

14. A method as claimed in claim 6 in which the source files are an install suite of computer programs in executable form.

15. A method as claimed in claim 6 in which the source files are sections of a document in machine readable form.

16. A file handling computer program capable of supporting a plurality of directories, each for maintaining at least one list of data files in non-volatile storage as a plurality of directory entries; said computer program comprising:
    first means for creating data file directory entries, each of which includes a file name, file attributes and a pointer to the location of said file data in storage;
    second means for creating anti-file directory entries, each of which includes a file name and also a file attribute indicating there is no real data file corresponding to:the directory entry;
    means for moving entries between directories;
    means for comparing data file and anti-file names in said directory entries within a directory; and
    means responsive to an equal compare by said comparing means to delete the directory entry for the respective real data file, thereby releasing the corresponding location in storage.

17. A computer program as claimed in claim 16 in which the deleting means is also responsive to an equal compare to delete the anti-file directory entry as well.

18. A computer program as claimed in claim 16 in which the anti-file attributes include a count, the second entry creating means being responsive to an equal compare to decrement the count attribute by one and in which the deleting means continues to delete identically named data file directory entries created by said first entry creating means as long as said count is non-zero.

19. A computer program as claimed in claim 18 in which the deleting means is responsive to delete the anti-file directory entry when said count equals zero.

20. A computer program as claimed in claim 16 in which the second entry creating means responds to an external system command to delete a real data file by creating an anti-file of the same name.

* * * * *